June 27, 1967  E. SÄNGER  3,327,970
ROCKET PROPELLED CRAFT
Filed Nov. 19, 1964  2 Sheets-Sheet 1

INVENTOR
Eugen Sänger
deceased
BY
Michael S. Striker
ATTORNEY

United States Patent Office 3,327,970
Patented June 27, 1967

3,327,970
ROCKET PROPELLED CRAFT
Eugen Sänger, deceased, late of Stuttgart-Vaihingen, Germany, by Irene Sänger-Bredt, heir and guardian of minor heir, Stuttgart-Vaihingen, Germany, assignor to Junkers Flugzeug- und Motorenwerke Aktiengesellschaft, Munich, Germany
Filed Nov. 19, 1964, Ser. No. 412,870
Claims priority, application Germany, Nov. 20, 1963, J 24,760
10 Claims. (Cl. 244—53)

The present invention relates to a rocket propelled craft, such as a space ship, and to a method of propelling the same.

It is known to increase the thrust of turbine jet engines by adding in an after burner fuel to the combustion gases leaving the turbine. Since the combustion gases contain a great percentage of unburned oxygen, the fuel added in the after burner is burned with the oxygen remainder, and the temperature, thrust and speed of the thrust stream are increased substantially.

It is one object of the invention to obtain complete combustion during operation of a rocket by a method in which the chemical conditions are reversed as compared with the prior art.

Rockets used for propelling high speed craft, such as space craft use a propellant composition including fuel, such as hydrogen, hydrocarbons, hydrazine, and a combustion supporting agent such as oxygen, ozone, fluorine. The propellant contains substantially more fuel than can be burned by the combustion supporting agent contained in the composition, so that the thrust stream of the rocket is composed of a reaction mass which is not completely burned.

In accordance with the present invention, air is added to the stream of the reaction mass, so that the unburned fuel in the reaction mass is completely combusted. The thus created additional energy is added to the thrust produced by the incomplete combustion of the propellant composition.

In the preferred embodiment of the invention, the rocket is disposed in a ram jet duct of the aircraft so that the air flowing through the duct achieves the complete combustion rearwardly of the rocket.

In rockets having a liquid propellant composition comprising liquid oxygen and hydrocarbon, the stoichiometric ratio of the molecular weights of the fuel and combustion supporting agent is substantially 3.5 while the maximal discharge speed of the reaction mass would be obtained at a ratio of 2.5. As a result, the discharged stream of the reaction mass contains 8.3% unburned fuel which reduce the molecular weight of the gaseous reaction mass, and thereby slightly increases the speed thereof.

In rockets having as propellant composition a mixture of liquid oxygen and liquid hydrogen, the stoichiometric weight ratio between the fuel and the combustion supporting agent is 8, while the maximum speed of the discharged gaseous reaction mass would be obtained at a ratio of 4. Under these circumstances, 10% of the gaseous combustion mass is unburned hydrogen.

Propellant compositions are generally used whose ratio is close to the stoichiometric ratio, since on one hand, the difference of the speeds of the thrust streams are not very great, and on the other hand the combustion supporting agents are substantially denser while stored than the fuel so that substantially stoichiometric ratios of the propellant composition results in smaller, and consequently lighter tanks.

In accordance with the present invention, a propellant composition having a substantial excess of fuel is used in view of the above-explained advantage, and air is added to the reaction mass to completely burn the excess of unburned fuel contained in the reaction mass. For example, a propellant composition $O_2/H_2$ which has a ratio of 4 to 1, is burned, and the hot and rapidly moving thrust stream of the rocket which contains still 10% of the fuel is mixed with at least 3.4 times as much air so that the unburned fuel combines with the oxygen of the air and is completely burned. For a calorific power of hydrogen 28,680 kcal./kg., each kilogram of the reaction mass of the rocket produces 2868 kcal./kg. thermal energy by which the temperature of the added air is increased 2500° C. In this manner, additional energy is gained and added to the thrust of the rocket without requiring an increase of the amount of propellant composition and fuel which is to be carried by the rocket craft, and without increasing the consumption of the fuel transported in the tanks of the rocket craft.

A preferred method of the invention comprises transporting in an aircraft, and burning in a rocket on said aircraft, a propellant composition containing a combustible fuel and a combustion supporting agent in such a weight ratio so that the fuel is only partly burned to form a gaseous reaction mass; moving the aircraft and the rocket, preferably at supersonic speed, so that air flows toward the rear end of the rocket; and guiding the reaction mass to form a thrust producing stream, directed into the flowing air at the rear end of the rocket so that complete combustion of the fuel and increased thrust are produced.

A rocket propelled craft in accordance with the preferred embodiment of the invention comprises means for forming a path for air flowing along the moving craft, for example a tubular duct surrounding the main body of the craft, or a central longitudinal duct in the body of the craft; rocket casing means located in the respective duct; and a combustible propellant composition located in the rocket casing means.

The propellant composition includes a combustible fuel and a combustion supporting agent in such a ratio that the fuel is only partly burned.

Since the rocket emits the thrust stream containing only partly burned fuel into the path of the flowing air, the oxygen contained in the air causes a complete combustion of the fuel whereby the speed and the thrust of the propelling stream are increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
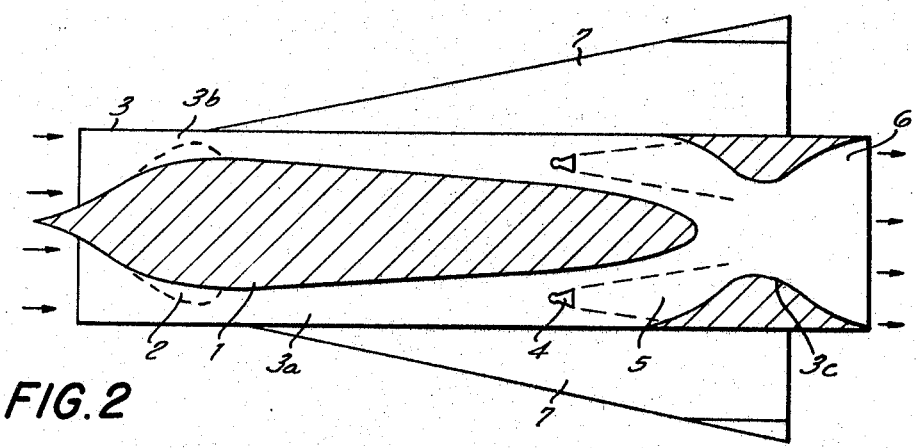
FIG. 2 is a schematic longitudinal section view illustrating a rocket propelled space craft in accordance with one embodiment of the invention.

Referring now to the drawings, and more particularly to FIG. 2, the main body 1 is of elongated shape and with a pointed front end and gradually tapering toward the rear along the greater part of its length to form a conical surface. The tanks for a propellant composition, the pay load, the cockpit, and the instruments are disposed in body 1, but not illustrated for the sake of simplicity. A tubular means 3 surrounds body 1, and is supported on the same by brackets, not shown, so that an annular duct portion 3a surrounds body 1. An adjustable expansible annular means 2 surrounds a forward portion of body 1, and forms a diffuser inlet 3b in the annular duct 3a. A plurality of rockets 4 are mounted on body 1 and tubular means 3 by suitable brackets, not shown, uniformly spaced from each other and from body 1 and located along a circle concentric with the main axis of body 1 and tubular means 3.

An inner annular projection 3c of tubular means 3 forms a constriction defining a duct portion 5, and a flaring outlet duct portion 6. Wings or fins 7 are mounted on the tubular means 3.

A liquid propellant composition is supplied from the tanks in body 1 through suitable pipes, not shown, to rockets 4, and burned. The stream emitted by the rockets propels the aircraft so that the air is rammed into the open front end of duct portion 3a, 3b, and due to the shape of duct portion 3a, 3b, the air moves at subsonic speed past rockets 4 into duct portion 5 which serves as a mixing chamber where the reaction mass of the burned propellant composition is mixed with fresh air so that the oxygen contained in the air causes complete combustion of the unburned portion of the fuel contained in the reaction mass. In this manner, the thrust of the gases flowing out of the open rear end of tubular means 3 through the outlet nozzle 6 is increased by the additional thrust produced by afterburning and acting on the conical rear end of main body 1.

Figure 3:
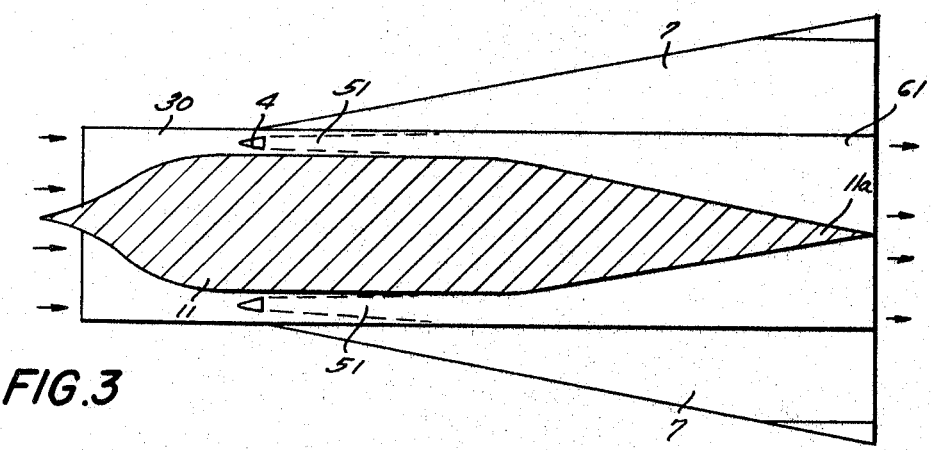
FIG. 3 is a longitudinal sectional view illustrating a space craft in accordance with another embodiment of the invention.

FIG. 3 illustrates another embodiment of the invention in which after burning is accomplished with air moving at supersonic speed.

Corresponding elements are indicated by like reference numerals in FIGS. 2 and 3. The main body 1 does not have the expansible control means 2, and its rear end 11a tapers toward the rear and is formed as a slender cone. Tubular means 30 has no constriction at its rear end, and the rockets 4 are located in the region of the forward portion of body 1.

The air rammed into the open front end of tubular means 30 flows rearward in longitudinal direction of the aircraft along the path formed between body 1 and tubular means 30, passes rockets 4 at supersonic speed and is mixed with the partly burned reaction mass emitted by rockets 4 in the annular duct portion 51. Consequently the mixing of air with the partly burned combustion gases and the after burning takes place at supersonic speed. The construction is simplified as compared with the embodiment of FIG. 2, and the diffuser effect is improved since the air flow is slowed down less. Furthermore, the mixing conditions are more favorable due to the small speed difference between the thrust stream of the rockets, and the admixed fresh air. The constriction 3c of the embodiment of FIG. 2 can be omitted, and the flaring outlet portion 61 of the tubular means 30 is obtained by the tapered shape of rear end portion 11a and serves as mixing chamber where the additional thrust produced by the afterburning acts on the conical rear end surface which slants away from the path of the air in the forward portion of body 1 while tubular means 30 can be made cylindrical.

It is a particular advantage of the construction of FIG. 3, as compared with the prior art, that the difficult problem arising in conventional hypersonic ram jet engines with liquid fuel ejections are eliminated, since in the construction of the invention, the fuel enters the after burning region 51 in completely dispersed hot condition together with the burned gases of the combustion mass.

The flow of the combustion gases is in no way inhibited since the duct portion 61 is practically free of atmospheric air, and has no projecting portions. The only disadvantage of this embodiment is the comparatively large wall surfaces with which the rapidly moving hot combustion gases are in contact.

Figure 4:
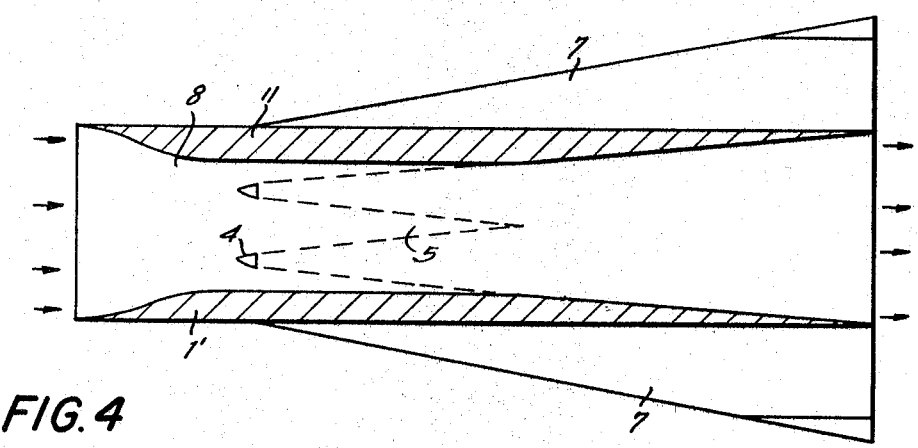
FIG. 4 is a longitudinal sectional view illustrating a space craft in accordance with a third embodiment of the invention.

In the embodiment of FIG. 4, the surface with which hot gases are in contact is substantially reduced as compared with the embodiments of FIGS. 2 and 3. A main body 1' is of annular shape and has a central longitudinally extending duct 8 with open front and rear ends. Wings or fins are supported on body 1'. Duct 8 has a gradually reduced inlet portion, and a gradually expanding outlet portion and a constricted region intermediate the two portions. Slightly rearwardly of the constricted region, rockets 4 are arranged in a circle around the central longitudinal axis of the tubular body 1'. When the aircraft is moved at supersonic speed, air is rammed into duct 8, and the partly burned reaction mass emitted by rockets 4 is mixed in the mixing chamber portion 5' of duct 8 with air moving at hypersonic speed, so that complete combustion takes place in the rear portion of duct 8 and increases the thrust of the stream discharged from the open rear end of duct 8 by the additional thrust acting on the outwardly flaring inner surface of the rear portion of tubular body 1'.

While in the embodiment of FIG. 2, tubular means 3 rearwardly project beyond the rear end of body 1, the rear ends of tubular means 30 and of body 11 are located in the same transverse plane in the embodiment of FIG. 3, and the same effect is obtained by the tubular body 1' of FIG. 4.

When the aircraft moves at very high hypersonic speed, the relative speed of the air flowing along the same is correspondingly high, and under such flow conditions particular effects take place. The pressure equalization in a direction transverse to the flow direction is substantially reduced.

Due to this phenomenon, it is possible to omit any tubular wall around the path of the air flowing in longitudinal direction along the aircraft, and being admixed to the partly burned reaction mass emitted by the rockets.

Figure 5:
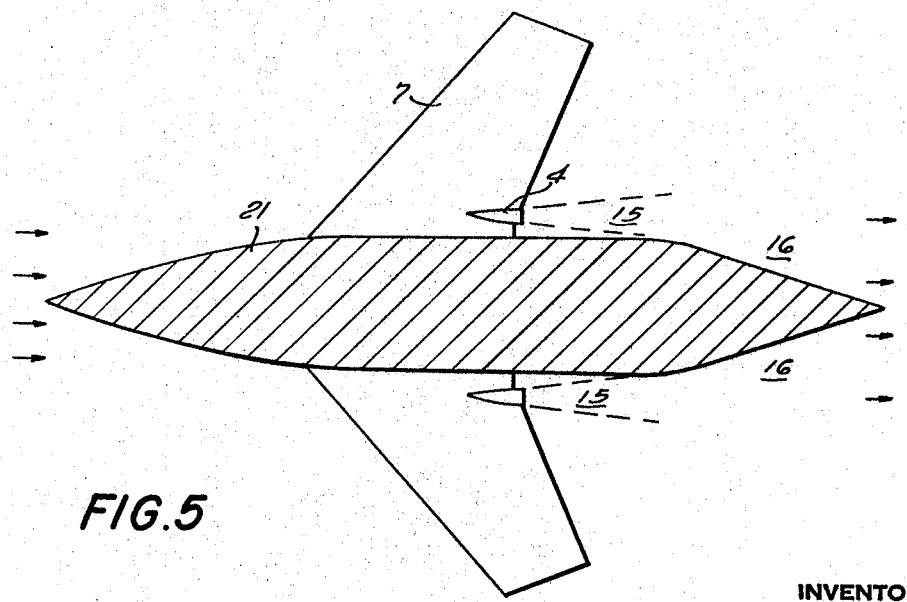
FIG. 5 is a longitudinal sectional view illustrating a space craft in accordance with a fourth embodiment of the invention.

In the embodiment of FIG. 5, the body 21 has a pointed front end and a pointed tapered conical rear end and wings 7 in the center region. Rockets 4 arranged on opposite sides of body 21, or around the same in a circle concentric with the longitudinal axis of body 21, propel the aircraft at hypersonic speed. Air flowing along the outer surface of body 21 at hypersonic speed causes a pressure increase in the region 16 surrounding the tapered rear end portion of body 21 by complete combustion since the partly burned reaction mass is mixed in the region 15 with the air flowing along body 21 and completely burned by the oxygen contained therein.

The thrust increase produced in the embodiment of FIG. 5 may be less than in the embodiments of FIGS. 3 and 4, but since the weight of the tubular means 30 can be omitted, and the mass of the body can be reduced, corresponding payloads may be carried by the aircraft of the several embodiments.

The rockets of the embodiment of FIG. 5 may be considered to be located in an annular supersonic mixing chamber having a solid wall only on one side, and formed by the surface of body 21.

The tubular means 3, 30 and 1' of the embodiments of FIGS. 2 to 4 may be circular, but can also be constructed in accordance with aerodynamic flow conditions, and be composed of planar walls, or of a tube of oval cross section.

In all embodiments of the invention, the rockets 4 include a casing in which a propellant composition containing a fuel and a combustion supporting agent in a stoichiometric weight ratio is burned so that the reaction mass contains fuel which can be oxidized in a ram jet-like air envelope. The after burning process produces heat which increases the temperature of the admixed air and causes an increase of the speed of the stream of combustion gas.

Reference is made to a publication by I. Sänger-Bredt entitled "Bemessungstafeln für Staustrahlantriebe," Part 2, Stuttgart 1959, from which it is apparent that if the mixing and after burning takes place in the above-explained manner, the speed increase $\Delta w$ of the air caused by the heating of the air depends on the speed $Ma$ of the aircraft expressed in Mach units in accordance with the following table:

$Ma=2$ Mach $\Delta w \sim 800$ m./sec.
$Ma=4$ Mach $\Delta w \sim 920$ m./sec.
$Ma=6$ Mach $\Delta w \sim 760$ m./sec.
$Ma=9$ Mach $\Delta w \sim 600$ m./sec.
$Ma=10$ Mach $\Delta w \sim 450$ m./sec.
$Ma=12$ Mach $\Delta w \sim 350$ m./sec.

Per kilogram air heated per second, an additional thrust of $P_2=w/g$ is obtained which corresponds to a thrust of 1 kilogram per second of the rocket exhaust stream of $P_2=3,4$ w/g.

If the rocket stream has an exhaust velocity of $w_1=4000$ m./sec., the thrust $P_1$ of the rocket per kilogram rocket stream mass is $P_1=w_1/g \sim 400$ kg., and the increase of the thrust due to the after burning in the mixing zone $(P_1+P_2)/P_1$ corresponds for the several speeds of the aircraft to the values set forth in the following table:

$Ma=2$ Mach $(P_1+P_2)/P_1=1.8$
$Ma=4$ Mach $(P_1+P_2)/P_1=1.9$
$Ma=6$ Mach $(P_1+P_2)/P_1=1.7$
$Ma=8$ Mach $(P_1+P_2)/P_1=1.6$
$Ma=10$ Mach $(P_1+P_2)/P_1=1.4$
$Ma=12$ Mach $(P_1+P_2)/P_1=1.3$ The average increase of the thrust within the above range of speed which includes a maximum speed of half the orbiting speed, is 65% of the thrust produced without the after burning process of the present invention.

Since the additional thrust is created without an increase of the amount of fuel stored and carried in the tanks of the aircraft, the specific impulse is increased, for example from 400 seconds to 660 seconds for the entire propulsion plant.

The thrust increase can be further improved by admixing a greater amount of air than assumed until now.

In the above example, it was assumed that the propellant composition was $O_2/H_2$ and that a reaction mass containing 10% fuel was mixed with 3.5 times the amount of air. Under such conditions, an amount of heat of 2868 kcal./kg. is obtained which increases the temperature of the admixed air by 2500° C. However, if not 3.4 times the amount of air but 27 times the amount of air is added to the rocket stream, the mixing temperatures remain so low that the dissociation of the rocket stream is reduced, and the enthalpy and kinetic energy of the rocket stream participate in the heating of the air, so that for an increase of the air temperature by 700° C., which is still above the igniting temperature of the hydrogen, the speed increases $\Delta w$ of the air are still one third of the values stated in the preceding table, so that the thrust increases at different speeds can be estimated in accordance with the following table:

$Ma= 2$ Mach $(P_1+P_2)/P_1=3.0$
$Ma= 4$ Mach $(P_1+P_2)/P_1=3.3$
$Ma= 6$ Mach $(P_1+P_2)/P_1=2.9$
$Ma= 8$ Mach $(P_1+P_2)/P_1=2.5$
$Ma=10$ Mach $(P_1+P_2)/P_1=2.1$
$Ma=12$ Mach $(P_1+P_2)/P_1=1.9$ From an interpretation of this table it becomes apparent that the average thrust increase is 160%, and that a specific impulse of 1040 seconds can be obtained, which is a value which can be otherwise obtained only by nuclear fission rockets, which have the great disadvantage of causing a radioactive contamination of the atmosphere. If the amount of fuel in the propellant composition is increased, the resulting thrust can be further increased.

If the inlet cross section of the air ducts explained with reference to the drawing is constant, a lesser mass of air enters the duct as the density of the surrounding air is reduced at greater heights, whereas the reaction mass of the burning rocket may remain the same. Space craft according to some constructions are designed so that the dynamic air pressure $\delta v^2/2$ remains substantially constant during the rising of the aircraft while moving in the range of the above listed speeds. Under such circumstances, the air mass entering per second through the invariable inlet cross section decreases proportional to the reciprocal value of the flying speed $v$, for example from a certain amount at the ground at $v=500$ m./sec. to one eighth of this amount at 30,000 meters and at a speed of $v=4000$ m./sec. In this case, the values of the thrust increases will be between the estimated values listed in the above tables.

Figure 1:
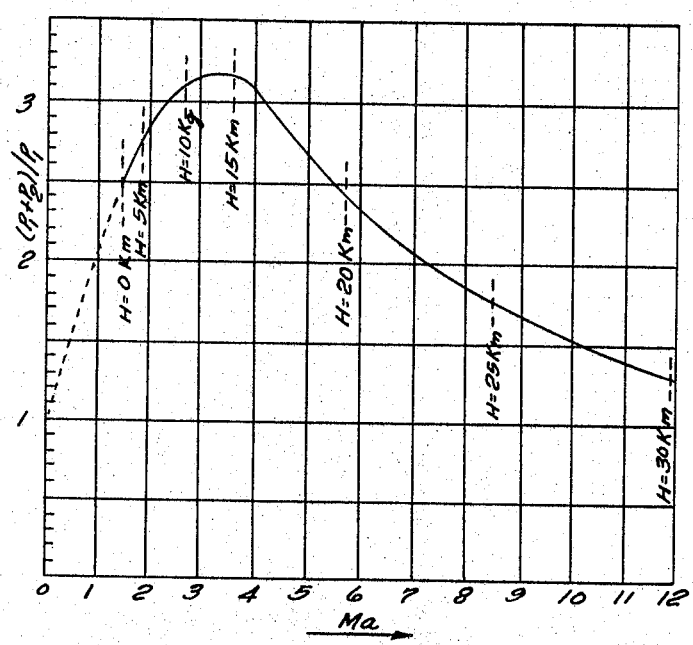
FIG. 1 is a diagram illustrating the increase of the thrust for different speeds of the craft.

These conditions are illustrated in FIG. 1. The abscissa of the diagram represents the flying speed in Mach, and the ordinate represents the relative thrust increase during the flight of a space craft from the ground to a height of 30,000 meters at a constant dynamic air pressure of $\delta v^2/2=15,700$ kg./m.$^2$. The average thrust increase is about 100% for the indicated range of air speed between zero and 12 Mach. Consequently, the thrust increase due to the after burning in the air envelope according to the present invention is substantially higher than in known arrangements according to which air is admixed to rocket streams without causing after burning of the remaining fuel with the admixed air. Note the following publications: Sänger, "Luftzumischung zu Abgasstrahlen," Ingenieur-Archiv. 18. vol., 5. Issue, 1950, S. 310–323 and ZVDI, 94. vol., No. 4, 1952, pages 111–112.

The great practical value of the high thrust increase achieved in accordance with the present invention will be apparent from the following example:

The rise of a space craft into an earth orbit with one rocket stage requires for a selected rocket stream speed of $w=4000$ m./sec. an amount of propellant which is 89% of the starting weight of the entire craft, so that under favorable conditions, 11% of the total weight remain for the space craft and tank structure, without any payload.

If the single stage rise into an earth orbit is carried out up to half the orbiting speed with the above explained thrust increase, and the second half of the rise without thrust increase using only the thrust of the rockets, the weight of the required propellant is reduced from 89% to 82% of the starting weight of the entire space craft, so that 7% of the starting weight is available for the payload. Considered in relation to the entire rise of the space craft into the orbital path, the after burning of the remaining fuel has the same effect as an increase of the specific impulse of the propelling rockets from 400 seconds to 520 seconds, corresponding to a 30% increase.

In FIG. 1, the height H above ground is indicated for several air speeds in kilometers, for example, at a speed of 1½ Mach, the rocket will leave the ground while the highest relative thrust increase will be reached at the height of 15,000 kilometers. At the height of 30 kilometers, the highest speed is obtained, but the relative thrust increase is lower.

It will be understood that each of the elements described above, or two or more together, may also find a useful application in other types of rocket propelled crafts differing from the types described above.

While the invention has been illustrated and described as embodied in a rocket-propelled space craft in which unburned fuel in the reaction mass of a propellant composition is oxygenized by air in an afterburning process, Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rocket propelled craft comprising, in combination, body means including a body member and a tubular member surrounding said body member and defining with the same an at least partly annular duct having open front and rear ends so that said duct forms a path for air flowing at supersonic speed rearwardly in longitudinal direction of the moving craft through said duct, at least one member having a rearwardly located inclined surface slanted rearwardly away from said path; rocket casing means located in said duct forwardly of said inclined surface; and a combustible propellant composition located in said rocket casing means and including a combustible fuel and a combustion supporting agent in such a ratio that said fuel is only partly burned whereby a main thrust stream containing only partly burned fuel is emitted from said rocket casing means into said duct and is mixed with said flowing air so that said partly burned fuel is then completely burned in the region of said inclined surface and produces an additional thrust stream acting on said inclined surface and causing an additional rearwardly directed thrust for forwardly propelling the craft.

2. A rocket propelled craft according to claim 1 wherein said body member has a tapered rear end portion, and tubular means surrounding said body and defining with the same an annular duct having open front and rear ends so that said duct forms said path for air flowing at supersonic speed into said open front end and through said annular duct during movement of the craft; wherein said rocket casing means include a plurality of rocket casings circumferentially spaced from each other and located in said annular duct in the region of the forwardly located portion of body member, wherein said body member forms said inclined surface on its tapered rear end portion; and wherein said fuel is completely burned between said tapered rear end portion and said tubular member.

3. A rocket propelled craft according to claim 2 wherein said tapered rear end portion is a slender cone terminating at the open rear end of said tubular member.

4. A rocket propelled craft according to claim 1, wherein said inclined surface is an annular surface.

5. A rocket propelled craft according to claim 1, wherein said tubular member includes a rear portion forming a rear duct portion extending rearwardly of said body member and having an open rear end so as to form said path for air flowing in longitudinal direction of said body member and said tubular member.

6. A rocket propelled craft comprising, in combination, body means including an elongated tubular body having a rear end portion with an inner annular outwardly flaring inclined surface through which air flows at supersonic speed rearwardly in longitudinal direction of the moving craft; rocket casing means located in said elongated tubular body forwardly of said inclined surface; and a combustible propellant composition located in said rocket casing means and including a combustible fuel and a combustion supporting agent in such ratio that said fuel is only partly burned whereby a main thrust stream containing only partly burned fuel is emitted from said rocket casing means into said tubular body and is mixed with said flowing air so that said partly burned fuel is then completely burned in the region of said inclined surface and produces an additional thrust stream acting on said inclined surface and causing an additional rearwardly directed thrust for forwardly propelling the craft.

7. A rocket propelled craft comprising, in combination, an elongated fuselage having a tapered rear end forming an inclined surface; rocket casing means including a plurality of rocket casings disposed on the outer surface of said fuselage spaced from each other in circumferential direction of the same and forwardly of said tapered rear end so as to be located in the air flowing along said fuselage; and a combustible propellant composition located in said rocket casing means and including a combustible fuel and a combustion supporting agent in such ratio that said fuel is only partly burned whereby a main thrust stream containing only partly burned fuel is emitted from said rocket casing means along said fuselage and is mixed with the air flowing along said fuselage so that said partly burned fuel is then completely burned in the region of said inclined surface and produces an additional thrust stream acting on said inclined surface and causing an additional rearwardly directed thrust for forwardly propelling the craft.

8. A rocket propelled craft as set forth in claim 5 wherein said tubular member has an inner annular projection projecting into said rear duct portion constricting the same rearwardly of said rear end of said body member and forming a flaring outlet duct portion in the region of said open rear end.

9. A rocket propelled craft according to claim 6 wherein said tubular body has a forwardly located portion outwardly flaring in forward direction so that a constricted duct portion is formed between said forwardly located portion and said rear end portion; and wherein said rocket casing means are located rearwardly of said forwardly located portion of said tubular body, and forwardly of said rear end portion of the same.

10. A rocket propelled craft according to claim 7 including wings on opposite sides of said fuselage; wherein said fuselage has a rear portion having an outer surface forming said inclined surface; and wherein said rocket casing means are secured to said wings adjacent said outer surface, and forwardly of said rear end of said fuselage.

References Cited

UNITED STATES PATENTS

| 2,763,426 | 9/1956 | Erwin | 244—53 |
| 2,799,987 | 7/1957 | Chandler | 60—245 |
| 2,926,613 | 3/1960 | Fox | 102—98 |

DUANE A. REGER, *Primary Examiner.*

MILTON BUCHLER, *Examiner.*

L. C. HALL, B. BELKIN, *Assistant Examiners.*